(12) United States Patent
Subramoney et al.

(10) Patent No.: US 6,950,837 B2
(45) Date of Patent: Sep. 27, 2005

(54) METHOD FOR USING NON-TEMPORAL STREAMING TO IMPROVE GARBAGE COLLECTION ALGORITHM

(75) Inventors: Sreenivas Subramoney, Palo Alto, CA (US); Richard L. Hudson, Northampton, MA (US)

(73) Assignee: Intel Corporation, Santa Clara, CA (US)

( * ) Notice: Subject to any disclaimer, the term of this patent is extended or adjusted under 35 U.S.C. 154(b) by 465 days.

(21) Appl. No.: 09/885,745

(22) Filed: Jun. 19, 2001

(65) Prior Publication Data

US 2002/0194210 A1 Dec. 19, 2002

(51) Int. Cl.$^7$ ............................................. G06F 17/00
(52) U.S. Cl. ...................................... 707/206; 711/138
(58) Field of Search ................................ 707/200, 204, 707/205, 206; 711/138, 118; 710/22

(56) References Cited

U.S. PATENT DOCUMENTS 6,205,520 B1   3/2001   Palanca et al.

FOREIGN PATENT DOCUMENTS

EP     0 383 097     8/1990

JP     02299239     6/1992

OTHER PUBLICATIONS

Schmidt, William J. and Nilsen, Kelvin D., "Performance of a Hardware-Assisted Real-Time Garbage Collector" ACM Sigplan Notices, Association of Computing Machinery, vol. 29, No. 11, Nov. 1, 1994, pp. 76-85.
PCT International Search Report, PCT/US 02/17960, mailed Jan. 7, 2003, 7 pages.

*Primary Examiner*—Uyen Le
(74) *Attorney, Agent, or Firm*—Blakely, Sokoloff, Taylor & Zafman LLP

(57) ABSTRACT

An improved moving garbage collection algorithm is described. The algorithm allows efficient use of non-temporal stores to reduce the required time for garbage collection. Non-temporal stores (or copies) are a CPU feature that allows the copy of data objects within main memory with no interference or pollution of the cache memory. The live objects copied to new memory locations will not be accessed again in the near future and therefore need not be copied to cache. This avoids copy operations and avoids taxing the CPU with cache determinations. In a preferred embodiment, the algorithm of the present invention exploits the fact that live data objects will be stored to consecutive new memory locations in order to perform streaming copies. Since each copy procedure has an associated CPU overhead, the process of streaming the copies reduces the degradation of system performance and thus reduces the time for garbage collection.

22 Claims, 2 Drawing Sheets

METHOD FOR USING NON-TEMPORAL STREAMING TO IMPROVE GARBAGE COLLECTION ALGORITHM

FIELD OF THE INVENTION

This invention relates generally to memory management in run-time environments, and more specifically to a garbage collection algorithm that uses non-temporal stores to reduce garbage collection time.

BACKGROUND OF THE INVENTION

The random access memory (RAM) of a computing system is a fixed size resource; currently a RAM size of 32 megabytes (Mb) is typical. The RAM must be managed properly to maintain system performance. In run-time environments such as Java or Microsoft CLI, memory management is handled by the system. Memory management includes a process known as "garbage collection". Garbage collection is a process with the aim of being as unobtrusive as possible in recycling memory. When a computer program is running it allocates and uses portions of memory on an ongoing basis. At some point the program may no longer need to use a particular portion of memory, e.g., the memory was allocated for a particular purpose that is no longer relevant. The portions that are no longer being used (garbage) are identified (collected) so that they can be reclaimed for future allocation. The garbage collection process taxes the central processing unit (CPU) and degrades system performance as perceived by the application. It is, therefore, highly desirable to reduce the time taken to reclaim unused portions of memory.

Typical computing systems have a cache memory between the CPU and main memory. The cache is small, typically 2 Mb or less, compared to main memory, that is typically 128 Mb. The cache is used to store, and provide fast access to data from the most recently used memory locations. The data is brought to cache with the expectation that it may be accessed again soon. Garbage collection takes place in main memory, but because most programs operate under the assumption that recently accessed data may be accessed again soon, the processing of garbage collection takes place in the cache as described below.

A popular garbage collection algorithm for use in run-time environments is the moving garbage collection algorithm (MGCA). The MGCA examines a memory block that may typically be from 1 Mb to 4 gigabytes (Gb) in size. The MGCA determines which memory data from the block is in use (live data) and which is garbage. As the name implies, MGCAs move all live data to new consecutive memory locations. This compacts the live data into a smaller space than when it was co-located with the garbage. Once the live data is copied to new locations the entire block can be reclaimed and reallocated.

A typical MGCA has three phases: mark, repoint, and copy. In the mark phase the live objects, those to be moved to a new memory location, are determined. At this point new memory locations for the data objects are determined. In the repoint phase the live objects are examined and their references are changed so that they refer to new memory locations. In the copy phase, the contents of each live object are copied to the new memory location.

In many programs when data is accessed, for example to be copied, the data is brought into cache memory. As described above, the cache provides quick access to frequently used memory, and it is assumed that recently accessed data may need to be accessed again soon. If the data is not used again soon it is then deleted from the cache. This process, based on temporal access patterns, frequently results in data being stored to cache only to be deleted when it is not accessed soon. This process taxes the cache memory in determining which data may be deleted from cache and also in having to actually delete it and possibly write back changed data to main memory.

When a live data object is copied to the new memory location, the data copied to the new memory location will not need to be accessed in the future. Therefore, copying the data to the cache in expectation of the data being accessed soon needlessly taxes CPU/cache resources.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

An improved moving garbage collection algorithm is described. The algorithm allows efficient use of non-temporal stores to reduce the required time for garbage collection. Non-temporal stores (or copies) are a CPU feature that allows the copy of data objects within main memory with no interference or pollution of the cache memory. The live objects copied to new memory locations will not be accessed in the near future and therefore need not be copied through the cache. If implemented, this avoids copy operations and avoids taxing the hardware. The algorithm of the present invention uses the fact that live data objects will be stored to consecutive new memory locations in order to perform streaming copy procedures. Since each copy procedure has an associated CPU overhead, the process of streaming the copies reduces the degradation of system performance and thus reduces the overall time for garbage collection.

Figure 1:
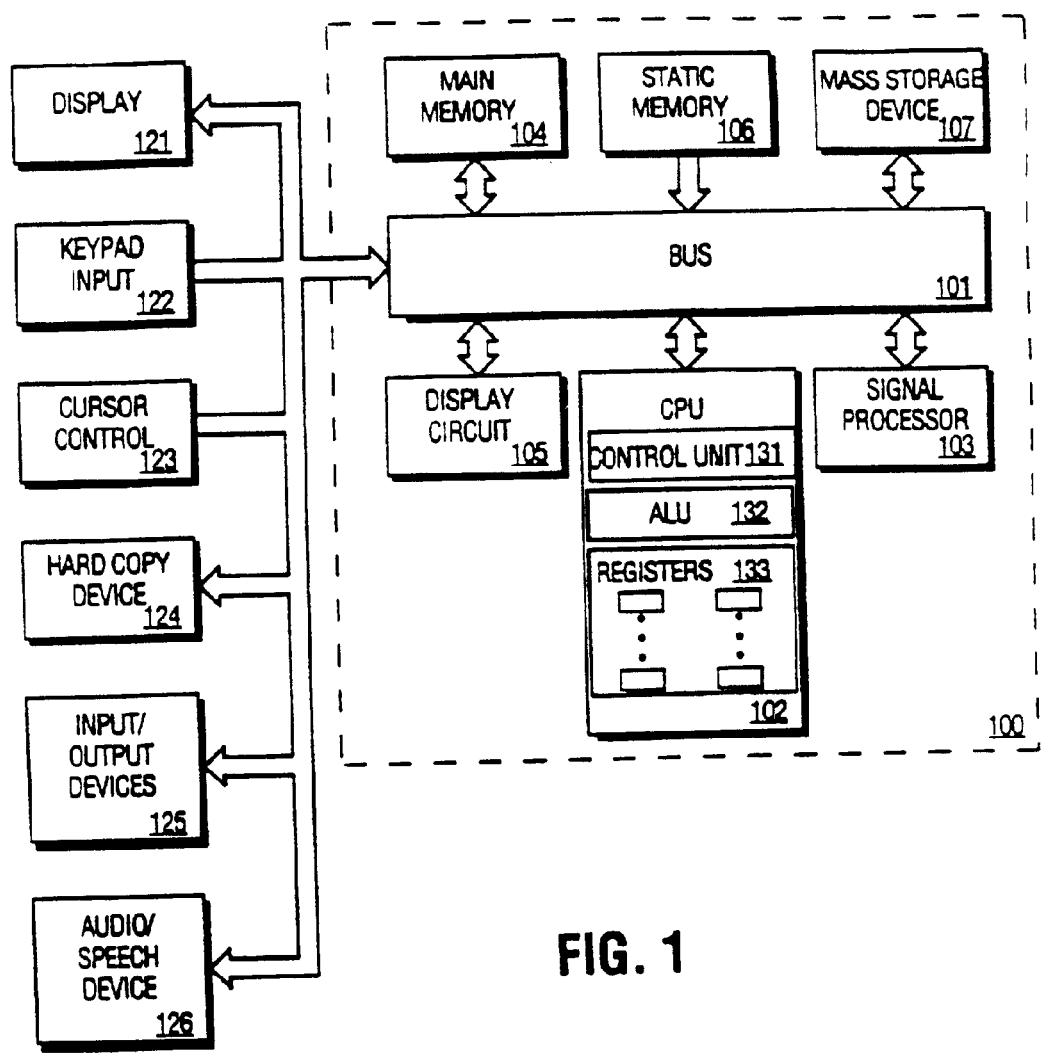
FIG. 1 is an illustration of an exemplary computing system for implementing the moving garbage collector of the present invention.

FIG. 1 is a diagram illustrating an exemplary computing system 100 for implementing the MGCA of the present invention. The use of non-temporal copy features and streaming copies for more efficient garbage collection described herein can be implemented and utilized within computing system 100. System 100 can represent a general-purpose computer, portable computer, or other like device. The components of computing system 100 are exemplary in which one or more components can be omitted or added. For example, one or more memory devices can be utilized for computing system 100.

Referring to FIG. 1, computing system 100 includes a central processing unit 102 and a signal processor 103 coupled to a display circuit 105, main memory 104, static memory 106, and mass storage device 107 via bus 101. Computing system 100 can also be coupled to a display 121, keypad input 122, cursor control 123, hard copy device 124, input/output (I/O) devices 125, and audio/speech device 126 via bus 101.

Bus 101 is a standard system bus for communicating information and signals. CPU 102 and signal processor 103 are processing units for computing system 100. CPU 102 or signal processor 103 or both can be used to process information and/or signals for computing system 100. CPU 102 includes a control unit 131, an arithmetic logic unit (ALU) 132, and several registers 133, which are used to process information and signals. Signal processor 103 can also include similar components as CPU 102.

Main memory 104 can be, e.g., a random access memory (RAM) or some other dynamic storage device, for storing information or instructions (program code), which are used by CPU 102 or signal processor 103. Main memory 104 may store temporary variables or other intermediate information during execution of instructions by CPU 102 or signal processor 103. Static memory 106, can be, e.g., a read only memory (ROM) and/or other static storage devices, for storing information or instructions, which can also be used by CPU 102 or signal processor 103. Mass storage device 107 can be, e.g., a hard or floppy disk drive or optical disk drive, for storing information or instructions for computing system 100.

Display 121 can be, e.g., a cathode ray tube (CRT) or liquid crystal display (LCD). Display device 121 displays information or graphics to a user. Computing system 100 can interface with display 121 via display circuit 105. Keypad input 122 is an alphanumeric input device with an analog to digital converter. Cursor control 123 can be, e.g., a mouse, a trackball, or cursor direction keys, for controlling movement of an object on display 121. Hard copy device 124 can be, e.g., a laser printer, for printing information on paper, film, or some other like medium. A number of input/output devices 125 can be coupled to computing system 100.

The automated process of garbage collection in accordance with the present invention can be implemented by hardware and/or software contained within computing system 100. For example, CPU 102 or signal processor 103 can execute code or instructions stored in a machine-readable medium, e.g., main memory 104.

The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions may be represented by carrier-wave signals, infrared signals, digital signals, and by other like signals.

Figures 2A, 2B:
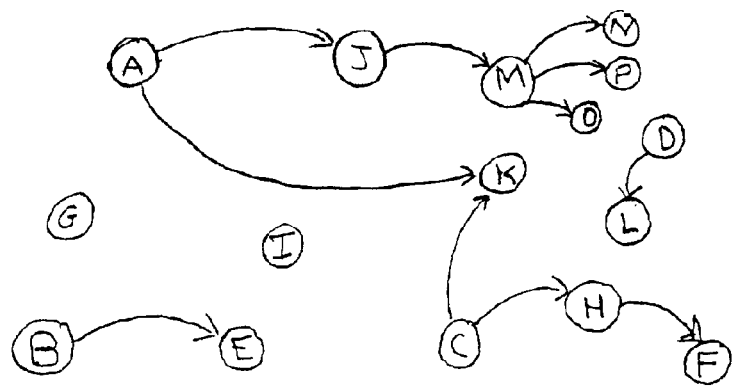
FIGS. 2A and 2B describe the use of the non-temporal streaming stores feature of the CPU to reduce the time required for garbage collection.

As described above, a typical MGCA includes a copy phase in which live objects are copied to new memory locations. An embodiment of the present invention uses non-temporal streaming stores (NTSS) to complete the copy phase of garbage collection. The use of NTSS allows the completion of the copy phase in less time, resulting in faster garbage collection. FIG. 2A describes the use of the non-temporal stores feature of the CPU to reduce the time required for garbage collection.

In FIG. 2A data objects are shown as A through P. For example, data objects A, B, C, and D, are a root set of data (i.e., references within the CPU registers, for example). Then A, B, C, and D, and all reachable (associated) data objects are considered live and will be moved. The arrows are references that indicate an association between the data objects. All transitive closure live objects are determined at the mark phase of the MGCA. In one embodiment the mark phase may result in the creation of a mark stack as shown at 205. As shown in FIG. 2A, data objects G and I are not included in the mark stack as they are not part of the root set nor are they reachable directly or transitively from members of the root set.

As each data object is determined to be live, new memory addresses are allocated. At the time a data object is added to the mark stack, a new memory location is determined for the data object because it is known that the data object must persist across the garbage collection. For example, as shown in FIG. 2B, for each live data object referenced in the mark stack, a new memory location is allocated and designated. The mark stack is shown as 205B and a corresponding array of references to new memory locations is shown as 210B. At this point the references for each data object are changed. This is the repoint phase. For example, data object A references data objects J and K. The new reference for A will be A' and A' will reference J' and K'.

In the copy phase, the actual contents of data object A (the actual bits of data) will be copied to the new memory location referenced as A'. This includes the portion of data object A that references associated data. This portion may have already been updated, that is references to J and K have been changed to reference J' and K' respectively. In an alternative embodiment data object A is copied to the new memory location referenced as A' and then the data objects associated with A (i.e. J and K) are updated.

After data object A is copied to A', A' need not be accessed again. The component of garbage collection in regard to data object A is complete. The MGCA simply moves on to the next data object referenced in the mark stack and continues updating and moving. In the copy phase of the MGCA, the data object being copied (e.g., data object A) is brought into the cache. There is no need to copy the contents of A' to cache, however, because that data object (i.e., A') will not be accessed in the near future. The algorithm of the present invention, included as Appendix A, uses non-temporal stores (NTSs) to copy the data objects directly to the designated new location in memory. The CPU, in connection with the memory controller, executes a non-temporal store causing a copy of A to the A' memory location without interference or pollution of the cache memory. The use of NTS reduces the time necessary for garbage collection because it reduces the amount of data that is needlessly copied to the cache only to be deleted after some time.

The algorithm of the present invention also uses write combining (streaming copies) to reduce the time required for garbage collection. As shown in FIG. 2B, the data objects referenced in mark stack 205B will be copied to new memory locations as referenced in mark stack 210B. For example, data objects A, B, and C will be copied to new locations as referenced by A', B', and C'. The algorithm of the present invention is designed such that all live objects are copied to consecutive new memory locations i.e., A', B', and C', for example, are consecutive locations. This allows use of the CPU's write combine (streaming copy) feature to copy several data objects asynchronously and transparently. Since each copy procedure has an associated CPU overhead, the process of streaming the copies reduces the degradation of system performance and thus reduces the time for garbage collection. The amount that can be copied is, of course, platform specific and dependent upon prevailing memory bus conditions.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

APPENDIX A

Copy Phase

```
// bytes_read keeps track of how many FROM space bytes
   have been read into the cache
// since the previous TO space streaming session
Initlize FROM space data counter, bytes_read to 0
Initialize an empty ancillary data structure D for holding
   tuples.
FOR EACH live object X whose address is in the ark stack
   DO
{
   FOR EACH non-null child reference R in the object X
      DO
   {
      Examine header of child to figure out new TO address,
         R'.
      In X, change R to R'
   }
   Locate the TO address X' of object X from the header of
      the object.
   Insert the association of X and X' as a tuple-(X,X') in data
      structure D
   Increment, bytes_read by the size of object X.
   IF (bytes_read GREATER_THAN_OR_EQUAL_TO
      CACHE_SIZE)
   {
      FOR EACH object tuple (Z,Z') contained in data struc-
         ture D
      {
         Copy using non-temporal streaming stores all the
            bits of object Z
         in FROM space to address Z' in TO space.
      }
      Flush/empty the data structure D.
      Reset the bytes_read counter to 0.
   }
}
```

What is claimed is:

1. A method comprising:

accessing a reference array, the reference array referencing at least one data object, each of the at least one data object having a contents stored in a corresponding memory location;

determining a new memory location for the contents of each of the at least one data object; and copying the contents of the at least one data object directly to the new memory location thus creating a new data object for each of the at least one data object, each new data object having a new data object contents, the contents of the at least one data object copied using a non-temporal streaming store, such that upon copying the contents of the at least one data object to the new memory location, the contents of each new data object does not get stored to a cache memory.

2. The method of claim 1 wherein the contents of consecutively referenced data objects are copied to consecutive memory locations.

3. The method of claim 2 wherein copying further includes copying the contents of the at least one data object using a write combine operation.

4. The method of claim 3 implemented upon a computing system having a central processing unit wherein an amount of data copied depends upon central processing unit parameters.

5. The method of claim 4 wherein the computing system operates in a dynamic run-time environment.

6. The method of claim 5 wherein the run-time environment is selected from the group consisting of JAVA and CLI.

7. The method of claim 6 implemented as the copy phase of a moving garbage collection algorithm.

8. A machine-readable medium that provides executable instructions, which when executed by a processor, cause the processor to perform a method, the method comprising:

accessing a reference array, the reference array referencing at least one data object, each of the at least one data object having a contents stored in a corresponding memory location;

determining a new memory location for the contents of each of the at least one data object; and copying the contents of the at least one data object directly to the new memory location thus creating a new data object for each of the at least one data object, each new data object having a new data object contents, the contents of the at least one data object copied using a non-temporal streaming store, such that upon copying the contents of the at least one data object to the new memory location, the contents of each new data object does not get stored to a cache memory.

9. The machine-readable medium of claim 8 wherein the contents of consecutively referenced data objects are copied to consecutive memory locations.

10. The machine-readable medium of claim 9 wherein copying further includes copying the contents of the at least one data object using a write combine operation.

11. The machine-readable medium of claim 10 implemented upon a computing system having a central processing unit wherein an amount of data copied depends upon central processing unit parameters.

12. The machine-readable medium of claim 11 wherein the computing system operates in a dynamic run-time environment.

13. The machine-readable medium of claim 12 wherein the run-time environment is selected from the group consisting of JAVA and CLI.

14. The machine-readable medium of claim 13 implemented as the copy phase of a moving garbage collection algorithm.

15. An apparatus comprising:

a register to hold a reference array, the reference array referencing at least one data object, each of the at least one data object having a contents;

a memory region corresponding to each data object to hold the contents of each of the at least one data object; and a central processing unit to determine a new memory location for the contents of each of the at least one data object, and copy the contents of the at least one data object directly to the new memory location thus creating a new data object for each of the at least one data object, each new data object having a new data object contents, the contents of the at least one data object copied using a non-temporal streaming store, such that upon copying the contents of the at least one data object to the new memory location, the contents of each new data object does not get stored to a cache memory.

16. The apparatus of claim 15 wherein the contents of consecutively referenced data objects are copied to consecutive memory locations.

17. The apparatus of claim 16 wherein copying further includes copying the contents of the at least one data object using a write combine operation.

18. The apparatus of claim 17 implemented upon a computing system having a central processing unit wherein an amount of data copied depends upon central processing unit parameters.

19. The apparatus of claim 18 wherein the computing system operates in a dynamic run-time environment.

20. The apparatus of claim 19 wherein the run-time environment is selected from the group consisting of JAVA and CLI.

21. The apparatus of claim 20 implemented as the copy phase of a moving garbage collection algorithm.

22. A method comprising:
determining a data object to be a live data object;
determining a new memory location for the data object;
updating references associated with the data object; and
using a non-temporal streaming store to copy a contents of the data object directly to the new memory location, thus creating a new data object corresponding to the data object, such that a copy of a contents of the new data object is not stored to a cache memory.

* * * * *